United States Patent
Hahn et al.

(10) Patent No.: US 9,237,589 B2
(45) Date of Patent: Jan. 12, 2016

(54) METHOD AND APPARATUS FOR PERFORMING PLURAL NETWORK ATTACHMENT PROCEDURES TO SUPPORT PLURAL CONNECTIONS IN A WIRELESS ACCESS SYSTEM

(71) Applicant: LG ELECTRONICS INC., Seoul (KR)

(72) Inventors: Genebeck Hahn, Seoul (KR); Jaehoon Chung, Seoul (KR); Hyeyoung Choi, Seoul (KR); Eunjong Lee, Seoul (KR); Heejeong Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 97 days.

(21) Appl. No.: 14/245,811

(22) Filed: Apr. 4, 2014

(65) Prior Publication Data

US 2014/0301308 A1    Oct. 9, 2014

Related U.S. Application Data

(60) Provisional application No. 61/808,222, filed on Apr. 4, 2013.

(51) Int. Cl.
*H04W 84/04* (2009.01)
*H04W 76/02* (2009.01)

(52) U.S. Cl.
CPC .......... *H04W 76/021* (2013.01); *H04W 76/025* (2013.01); *H04W 84/045* (2013.01)

(58) Field of Classification Search
None
See application file for complete search history.

(56) References Cited

U.S. PATENT DOCUMENTS

| 2014/0198655 A1* | 7/2014 | Ishii | H04W 76/023 370/235 |
|---|---|---|---|
| 2014/0242946 A1* | 8/2014 | Wu | H04W 76/025 455/410 |

FOREIGN PATENT DOCUMENTS

| WO | WO 2014/111137 A1 * | 7/2014 | H04W 8/26 |
|---|---|---|---|
| WO | WO 2014/112767 A1 * | 7/2014 | H04B 7/26 |

* cited by examiner

*Primary Examiner* — Hoon J Chung
(74) *Attorney, Agent, or Firm* — Lee, Hong, Degerman, Kang & Waimey

(57) ABSTRACT

A method and apparatus for performing a plurality of network attachment procedures to support a plurality of cells for a small cell-based User Equipment (UE) service are disclosed.

12 Claims, 8 Drawing Sheets

METHOD AND APPARATUS FOR PERFORMING PLURAL NETWORK ATTACHMENT PROCEDURES TO SUPPORT PLURAL CONNECTIONS IN A WIRELESS ACCESS SYSTEM

CROSS-REFERENCE TO RELATED APPLICATIONS

This application claims the benefit of U.S. Provisional Patent Application No. 61/808,222, filed on Apr. 4, 2013, the contents of which are hereby incorporated by reference herein in its entirety.

BACKGROUND OF THE INVENTION

1. Field of the Invention

The present invention relates to a wireless access system, and more particularly, to a method and apparatus for performing a plurality of network attachment procedures to support a plurality of connections for a small cell-based User Equipment (UE) service.

2. Discussion of the Related Art

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

Recently, a wireless access network configuration has been changed such that various types of small cells having small sizes such as a pico cell, a femto cell, etc. interact with a macro cell having a relatively large size. The wireless access network configuration aims to provide a high data rate to final UEs and thus increase Quality of Experience (QoE) for the final UEs in a situation where multi-layer cells co-exist in a hierarchical structure basically involving a macro cell.

According to one of the current $3^{rd}$ Generation Partnership Project (3GPP) standardization categories, Small Cell Enhancements for E-UTRA and E-UTRAN SI; e.g., RP-122033, enhancement of indoor/outdoor scenarios using low-power nodes is discussed under the title of small cell enhancement. In addition, scenarios and requirements for the small cell enhancement are described in 3GPP TR 36.932.

Considering the development trend, a larger number of smaller cells will be deployed within macro cells and thus final UEs will be located physically nearer to a network. Accordingly, it is expected that communication will be conducted through UE-based zones in a future-generation wireless access network, instead of conventional physical cell-based communication. To realize communication through UE-based zones with the aim of increasing throughput, technical issues should be handled to provide a service providing unit such as a UE zone, different from a conventional service providing unit such as a physical cell. The emergence of these small cells may significantly affect a current Remote Area Network (RAN).

According to 3GPP TS 36.300, a cell is basically composed of downlink resources and optional uplink resources. Linkage between the carrier frequencies of the downlink resources and the carrier frequencies of the uplink resources is indicated by System Information (SI) transmitted in downlink resources.

According to 3GPP TS 23.401, if a UE is to receive a service requiring registration, the UE should register to a network. The registration procedure is referred to as network attachment. During the network attachment, an evolved Node B (eNB or eNode B) and/or the UE establishes an Evolved Packet System (EPS) bearer, thereby enabling 'Always on Internet Protocol (IP) connectivity' for the UE. In the network attachment procedure, one or more dedicated bearer establishment operations may be triggered to establish dedicated EPS bearers for the UE. In addition, the UE may request allocation of an IP address during the network attachment.

Considering a future high-density small cell deployment scenario, UE-based zone configuration will be a significant issue. Accordingly, a current network attachment procedure needs to be improved to support UE-based zone configuration.

SUMMARY OF THE INVENTION

Accordingly, the present invention is directed to a method and apparatus for performing plural network attachment procedures to support plural connections in a wireless access system that substantially obviate one or more problems due to limitations and disadvantages of the related art.

An object of the present invention is to provide various methods for supporting a plurality of connections for a User Equipment (UE) in a small-cell environment.

Another object of the present invention is to provide a method for configuring a UE zone in a UE-centered manner, beyond conventional cell-based connectivity.

An object of the present invention is to provide a method and apparatus for supporting a plurality of connections for a UE-based zone configuration.

An object of the present invention is to provide an apparatus supporting the above methods.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

The present invention relates to a wireless access system. Particularly, the present invention provides a method and apparatus for performing a plurality of network attachment procedures to support a plurality of connections for a small cell-based UE service.

To achieve these objects and other advantages and in accordance with the purpose of the invention, as embodied and broadly described herein, a method for performing a plurality of network attachment procedures to form a UE zone with a plurality of cells at a UE in a wireless communication system includes receiving, from a macro cell and a plurality of small cells, one or more measurement messages each including at least one of load status information and radio resource usage status information about a cell, selecting the macro cell and a first small cell with which the plurality of network attachment procedures are to be performed, based on the one or more measurement messages, transmitting, to the macro cell, an attach request message including an attach type indicating the plurality of network attachment procedures and information about the first small cell, transmitting, to the first small cell, an attach request message including an attach type indicating the plurality of network attachment procedures and information about the macro cell, receiving, from the macro cell, a first Radio Resource Control (RRC) connection reconfiguration message including a first Evolved Packet System (EPS) radio bearer Identifier (ID) used in the macro cell, receiving, from the first small cell, a second RRC connection reconfiguration message including a second EPS radio bearer ID used in the first small cell, and performing data communication by connecting to the macro cell and the first small cell simultaneously using the first EPS radio bearer ID and the second EPS radio bearer ID.

The load status information may be information about at least one of a hardware load and an S1 Transport Network Layer (TNL) load.

The method may further include transmitting, to the macro cell, a first RRC connection reconfiguration complete message including information about the first small cell in response to the first RRC connection reconfiguration message, and transmitting, to the first small cell, a second RRC connection reconfiguration complete message including information about the macro cell in response to the second RRC connection reconfiguration message.

In another aspect of the present invention, a method for supporting a plurality of network attachment procedures to allow a UE to form a UE zone with a plurality of cells at a Mobility Management Entity (MME) in a wireless access system includes receiving, from a macro cell, a first attach request message including an attach type indicating the plurality of network attachment procedures and information about a first small cell to form the UE zone, receiving, from the first small cell, a second attach request message including an attach type indicating the plurality of network attachment procedures and information about the macro cell, configuring the UE zone based on the first attach request message and the second attach request message, allocating a first EPS radio ID and a second EPS radio bearer ID for use in the UE zone to the UE, transmitting, to the macro cell, a first attach accept message including the first EPS radio bearer ID used in the macro cell, and transmitting, to the first small cell, a second attach accept message including the second EPS radio bearer ID used in the first small cell. The MME supports data communication that the UE performs by connecting to the macro cell and the first small cell simultaneously using the first EPS radio bearer ID and the second EPS radio bearer ID.

Each of the first attach accept message and the second attach accept message may be transmitted in an initial context setup request message.

The method may further include transmitting, to a Serving GateWay (S-GW), a session creation request message to form the UE zone with the plurality cells, and receiving, from the S-GW, a session creation response message including information about a created session in response to the session creation request message.

In another aspect of the present invention, a UE for performing a plurality of network attachment procedures to form a UE zone with a plurality of cells in a wireless communication system includes a transmitter, a receiver, and a processor. The processor is configured to receive, from a macro cell and a plurality of small cells through the receiver, one or more measurement messages each including at least one of load status information and radio resource usage status information about a cell, to select the macro cell and a first small cell with which the plurality of network attachment procedures are to be performed, based on the one or more measurement messages, to transmit, to the macro cell through the transmitter, an attach request message including an attach type indicating the plurality of network attachment procedures and information about the first small cell, to transmit, to the first small cell through the transmitter, an attach request message including an attach type indicating the plurality of network attachment procedures and information about the macro cell, to receive, from the macro cell through the receiver, a first RRC connection reconfiguration message including a first EPS radio bearer ID used in the macro cell, and to receive, from the first small cell through the receiver, a second RRC connection reconfiguration message including a second EPS radio bearer ID used in the first small cell. The UE performs data communication by connecting to the macro cell and the first small cell simultaneously using the first EPS radio bearer ID and the second EPS radio bearer ID.

The load status information may be information about at least one of a hardware load and an S1 TNL load.

The processor may transmit, to the macro cell through the transmitter, a first RRC connection reconfiguration complete message including information about the first small cell in response to the first RRC connection reconfiguration message, and may transmit, to the first small cell through the transmitter, a second RRC connection reconfiguration complete message including information about the macro small cell in response to the second RRC connection reconfiguration message.

In another aspect of the present invention, an MME for supporting a plurality of network attachment procedures to allow a UE to form a UE zone with a plurality of cells in a wireless access system includes a transmitter, a receiver, and a processor. The processor is configured to receive, from a macro cell through the receiver, a first attach request message including an attach type indicating the plurality of network attachment procedures and information about a first small cell to form the UE zone, to receive, from the first small cell through the receiver, a second attach request message including an attach type indicating the plurality of network attachment procedures and information about the macro cell, to configure the UE zone based on the first attach request message and the second attach request message, to allocate a first EPS radio bearer ID and a second EPS radio bearer ID for use in the UE zone to the UE, to transmit, to the macro cell through the transmitter, a first attach accept message including the first EPS radio bearer ID used in the macro cell, and to transmit, to the first small cell through the transmitter, a second attach accept message including the second EPS radio bearer ID used in the first small cell. The MME supports data communication that the UE performs by connecting to the macro cell and the first small cell simultaneously using the first EPS radio bearer ID and the second EPS radio bearer ID.

Each of the first attach accept message and the second attach accept message may be transmitted in an initial context setup request message.

The processor may transmit, to an S-GW through the transmitter, a session creation request message to form the UE zone with the plurality cells, and may receive, from the S-GW through the receiver, a session creation response message including information about a created session in response to the session creation request message.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
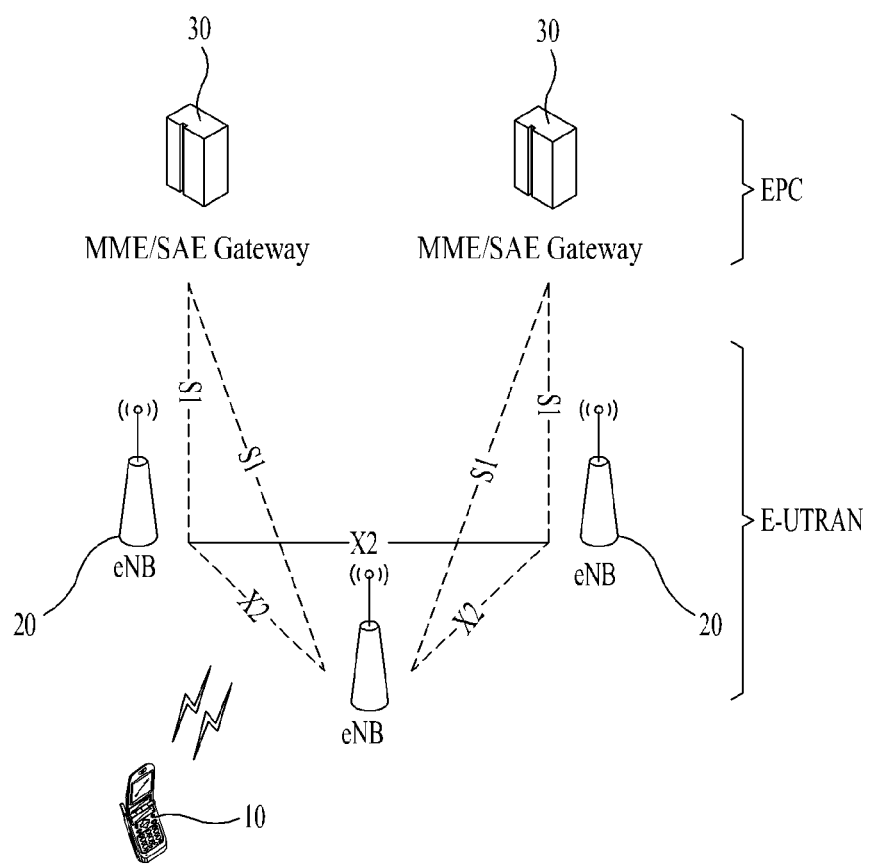
FIG. 1 illustrates a network configuration of an Evolved-Universal Mobile Telecommunication System (E-UMTS)

Embodiments of the present invention relate to a method and apparatus for performing a plurality of network attachment procedures simultaneously to support a plurality of connections for a small cell-based User Equipment (UE) service.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

In the disclosure, 'include' or 'comprise' should be interpreted as that other components may further be included, not excluded, unless otherwise specified. The term '-unit', '-or (er)', 'module', etc. signifies at least one function or operation processing unit that can be implemented in hardware, software, or a combination thereof. In addition, it is to be understood that the singular forms 'a, 'an', and 'the' include plural referents unless the context clearly dictates otherwise.

In the embodiments of the present invention, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present invention, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present invention can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). The UMTS is a 3rd Generation (3G) asynchronous mobile communication system operating in Europe system-based Wideband CDMA (WCDMA), GSM, and GPRS. 3rd Generation Partnership Project Long Term Evolution (3GPP LTE) is a part of Evolved UMTS (E-UMTS) using E-UTRA, adopting OFDMA for DL and SC-FDMA for UL. LTE-Advanced (LTE-A) is an evolution of 3 GPP LTE.

While embodiments of the present invention are described in the context of a 3GPP LTE/LTE-A system in order to clarify the technical features of the present invention, the technical features of the present invention are not limited to the specific system. The following detailed description includes specific terms in order to provide a thorough understanding of the present invention. However, it will be apparent to those skilled in the art that the specific terms may be replaced with other terms without departing the technical spirit and scope of the present invention.

Embodiments of the present invention are provided to enable UE-based zone configuration beyond conventional physical cell-based connectivity. In the embodiments of the present invention, a UE-based zone is referred to as a 'UE zone'. To configure a UE zone, a UE may request UE zone configuration by transmitting information about a macro cell or a small cell to which the UE wants to be kept connected to the macro cell or the small cell. In embodiments of the present invention, a UE zone may be formed by maintaining a plurality of connections to two or more cells through network attachment procedures by a UE.

A macro cell may determine small cells that may offer optimum connections based on UE-reported measurement information, for each UE and thus may support UE zone configuration to provide connections to the UE. The measurement information may include an indication indicating an attach type (or a request type) for zone configuration in addition to a conventional network attachment procedure and/or an Identifier (ID) of a small cell to which a UE wants to be kept connected. The measurement information may further include mobility information traced by the UE or information about small cells that may be carried with a user, in terms of zone configuration based on UE preferences.

The mobility information traced by the UE may include information about UE-preferred small cells (e.g., small cells frequently used by the UE) and information about small cells through which the UE traces its path and thus which have been visited by the UE a predetermined number of or more times. The technical features of the present invention will be described in more detail with reference to the attached drawings.

I. 3GPP LTE/LTE-A Network Configuration

The following description will be given of a network configuration available to a 3GPP LTE/LTE-A system to which embodiments of the present invention are applicable.

FIG. 1 illustrates a network configuration of an E-UMTS.

The E-UMTS is also called an LTE system. A communication network is deployed over a wide area and provides various communication services such as voice, Voice over Internet Protocol (VoIP) over IP Multimedia Subsystem (IMS), and packet data.

Referring to FIG. 1, an E-UMTS network includes an Evolved-UMTS Terrestrial Radio Access Network (E-UTRAN), an Evolved Packet Core (EPC), and one or more UEs. The E-UTRAN may include one or more eNBs 20 and one or more UEs 10 may be located within one cell. One or more E-UTRAN Mobility Management Entity (MME)/System Architecture Evolution (SAE) GateWays (GWs) 30 may be located at an end of the network and connected to an external network.

An eNB 20 provides user-plane and control-plane end points to a UE 10. An MME/SAE GW 30 provides an end point of a session and mobility management function to the UE 10. The eNB 20 and the MME/SAE GW 30 may be connected to each other via an S1 interface.

In general, the eNB 20 is a fixed station communicating with the UE 10, also called a BS or an access point. One eNB 20 may be deployed in each cell. An interface for transmitting user traffic or control traffic may be used between eNBs 20.

An MME performs various functions for the eNB 20, including Non-Access Stratum (NAS) signaling, NAS signaling security, Access Stratum (AS) security control, inter-Core Network (inter-CN) node signaling (including control and implementation of paging retransmission) for mobility between 3GPP access networks, idle-mode UE reachability, tracking area list management (for UEs in idle mode and active mode), Packet Data Network GateWay (PDN GW) and serving GW selection, MME selection for handover accompanied by MME switching, selection of a Serving GPRS Support Node (SGSN) for handover to a 2G or 3G 3GPP access network, roaming, authentication, bearer management including dedicated bearer establishment, Public Warning System (PWS) (including Earthquake and Tsunami Warning System (ETWS) and Commercial Mobile Alert System (CMAS)), and support of message transmission.

An SAE GW host provides various functions including per-user packet filtering (e.g. using a deep packet check), lawful interception, UE IP address allocation, transport-level packet marking on DL, UL and DL service-level billing, gating and rate enhancement, and Access Point Name-Aggregated Maximum Bit Rate (APN-AMBR)-based DL rate enhancement.

The MME/SAE GW 30 is referred to simply as a 'GW'. However, the MME/SAE GW 30 includes both an MME and an SAE GW.

A plurality of nodes may be connected between the eNB 20 and the GW 30 via an S1 interface. eNBs 20 may be interconnected via an X2 interface and adjacent eNBs may form a mesh network having an X2 interface.

Figure 2:
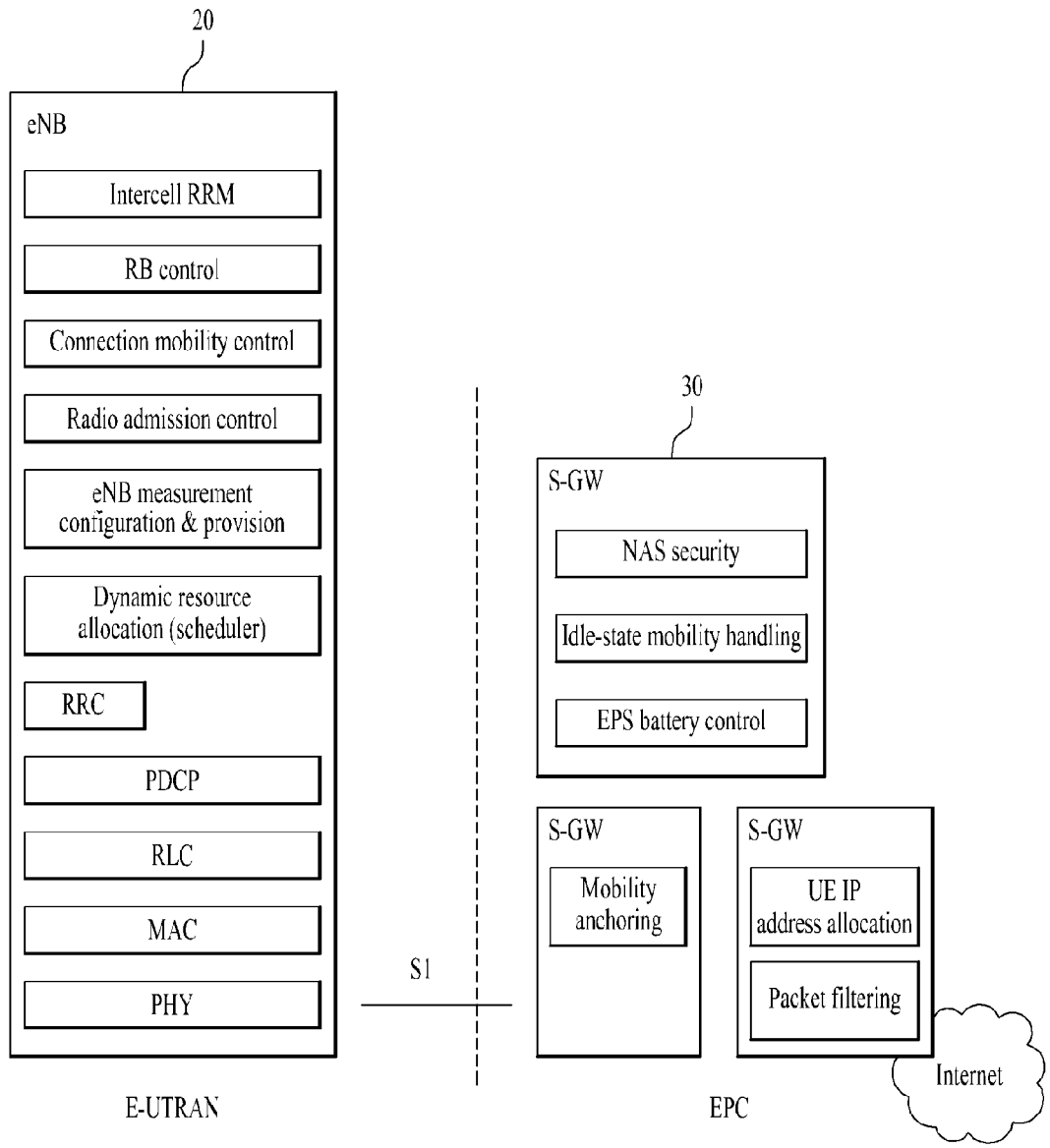
FIG. 2 is a block diagram of a general E-UMTS and a general GateWay (GW)

FIG. 2 is a block diagram of a general E-UTRAN and a general GW 30.

Referring to FIG. 2, the eNB 20 may perform functions such as selection of a GW 30, routing to the GW 30 during Radio Resource Control (RRC) activation, scheduling and transmission of a paging message, scheduling and transmission of Broadcast Control Channel (BCCH) information, dynamic DL and UL resource allocation to UEs 10, configuration and preparation of eNB measurement, radio bearer control, Radio Admission Control (RAC), and connection mobility control in LTE_ACTIVE state. In the EPC, the GW 30 may perform functions such as paging origination, LTE_IDLE state management, user-plane encryption, SAE bearer control, and cyphering and integrity protection for NAS signaling.

Figure 3:
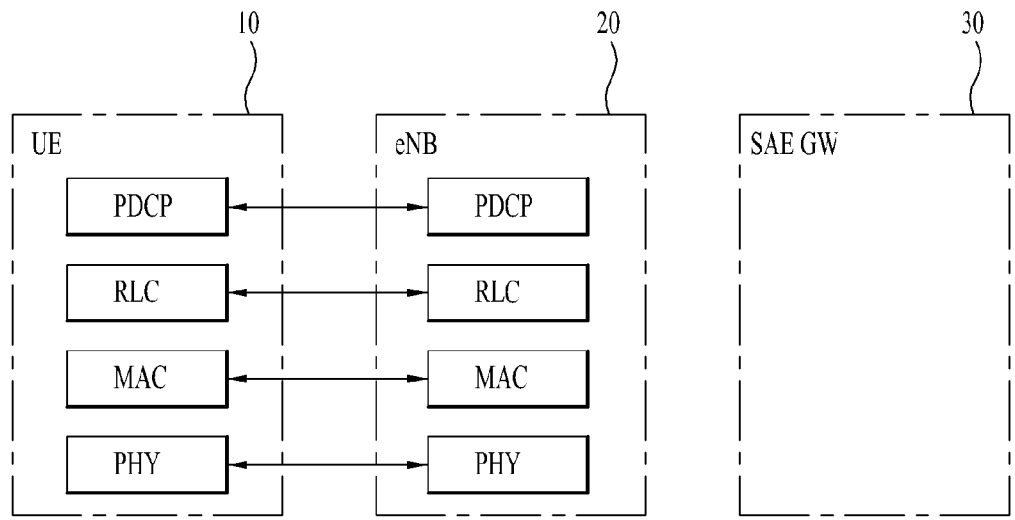
FIGS. 3 and 4 illustrate a user-plane protocol stack and a control-plane protocol stack for an E-UMTS, respectively.
Figure 4:
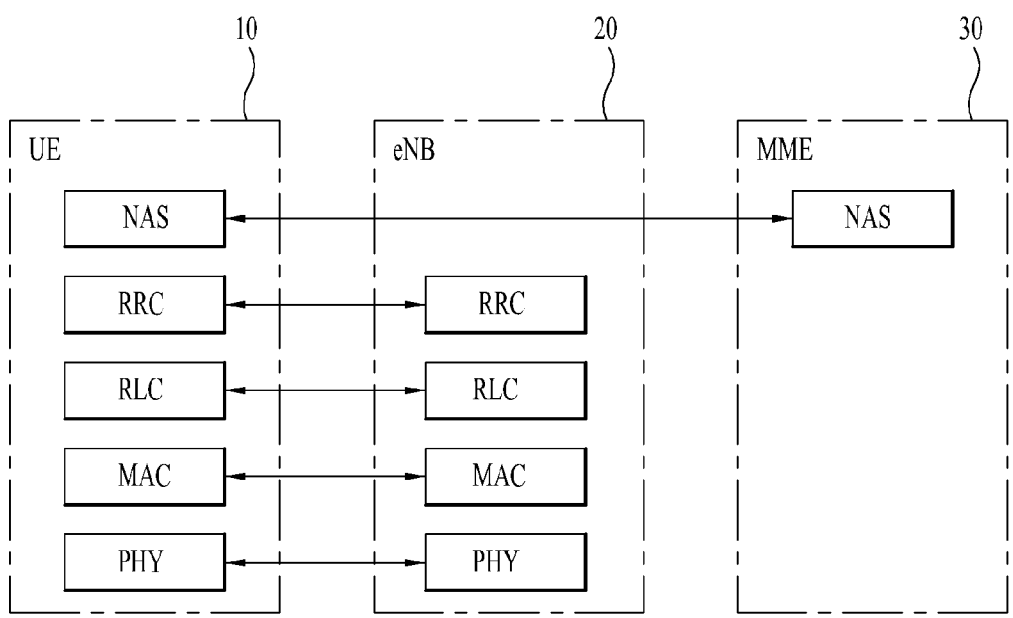

FIGS. 3 and 4 illustrate a user-plane protocol stack and a control-plane protocol stack for an E-UMTS.

Referring to FIGS. 3 and 4, protocol layers may be divided into Layer 1 (L1), Layer 2 (L2), and Layer 3 (L3) based on the lowest three layers of the Open System Interconnection (OSI) reference model known to the technical field of communication systems.

A PHYsical (PHY) layer, that is, L1 provides an information transfer service to a higher layer on physical channels. The PHY layer is connected to a Medium Access Control (MAC) layer above the PHY layer through transport channels and data is transmitted between the MAC layer and the PHY layer through the transport channels. Data is transmitted between different PHY layers such as the PHY layer of a transmitter and the PHY layer of a receiver on physical channels.

At L2, the MAC layer provides a service to its higher layer, Radio Link Control (RLC) through logical channels. The RLC layer of L2 supports reliable data transmission. While RLC layers are shown in FIGS. 3 and 4, if the MAC layer takes over RLC functionality, the RLC layer is not required.

A Packet Data Convergence Protocol (PDCP) layer of L2 performs a header compression function to reduce unnecessary control information. Thus, data may be efficiently transmitted in IP packets such as IP version 4 (IPv4) or IP version 6 (IPv6) packets via a radio interface having a relatively narrow bandwidth.

An RRC layer at the lowest part of L3 is defined only in the control plane and controls logical channels, transport channels, and physical channels in regards to configuration, reconfiguration, and release of Radio Bearers (RBs). An RB refers to a service provided by L2, for data transmission between the UE 10 and the E-UTRAN.

As illustrated in FIG. 3, the RLC layer and the MAC layer are terminated as the eNB 20 on the network side and may perform functions such as scheduling, Automatic Repeat reQuest (ARQ), and Hybrid ARQ (HARQ). The PDCP layer is terminated at the eNB 20 on the network side and may perform user-plane functions including header compression, integrity protection, and encryption.

Referring to FIG. 4, the RLC layer and the MAC layer are terminated at the eNB 20 on the network side and perform the same functions as control-plane functions. As illustrated in FIG. 4, the RRC layer is terminated at the eNB 20 on the network side and may control functions such as broadcasting, paging, RRC connection management, RB control, mobility, and measurement report and control of the UE 10. A NAS control protocol is terminated at an MME of the GW on the network side and may perform functions such as SAE bearer management, authentication, LTE_IDLE mobility handling, LTE_IDLE paging, and security control for signaling between the GW and the UE 10.

RRC states may be categorized into two different states, RRC_IDLE and RRC_CONNECTED.

In RRC_IDLE state, the UE 10 may receive broadcast system information and paging information during a Discontinuous Reception (DRX) cycle configured by the NAS. The UE 10 may be allocated an ID that uniquely identifies the UE 10 in a tracking area and may select or reselect a Public Land Mobile Network (PLMN). In the RRC_IDLE state, no RRC context is stored in an eNB.

In RRC_CONNECTED state, the UE 10 has an E-UTRAN connection and an RRC context used in the E-UTRAN and thus may transmit and/or receive data to and/or from the eNB. The UE 10 may also report channel quality information and feedback information to the eNB.

In the RRC_CONNECTED state, the E-UTRAN identifies a cell to which the UE 10 belongs. Therefore, the network may transmit and/or receive data to and/or from the UE 10, control UE mobility (handover and an order to change an inter-Radio Access Technology (inter-RAT) cell to a GSM EDGE Radio Access Network (GERAN) having a Network Assisted Cell Change (NACC)), and perform cell measurement on neighbor cells.

In the RRC_IDLE state, the UE 10 specifies a paging DRX cycle. Specifically, the UE 10 monitors a paging signal at a specific paging occasion in each specific paging DRX cycle.

Figure 5:
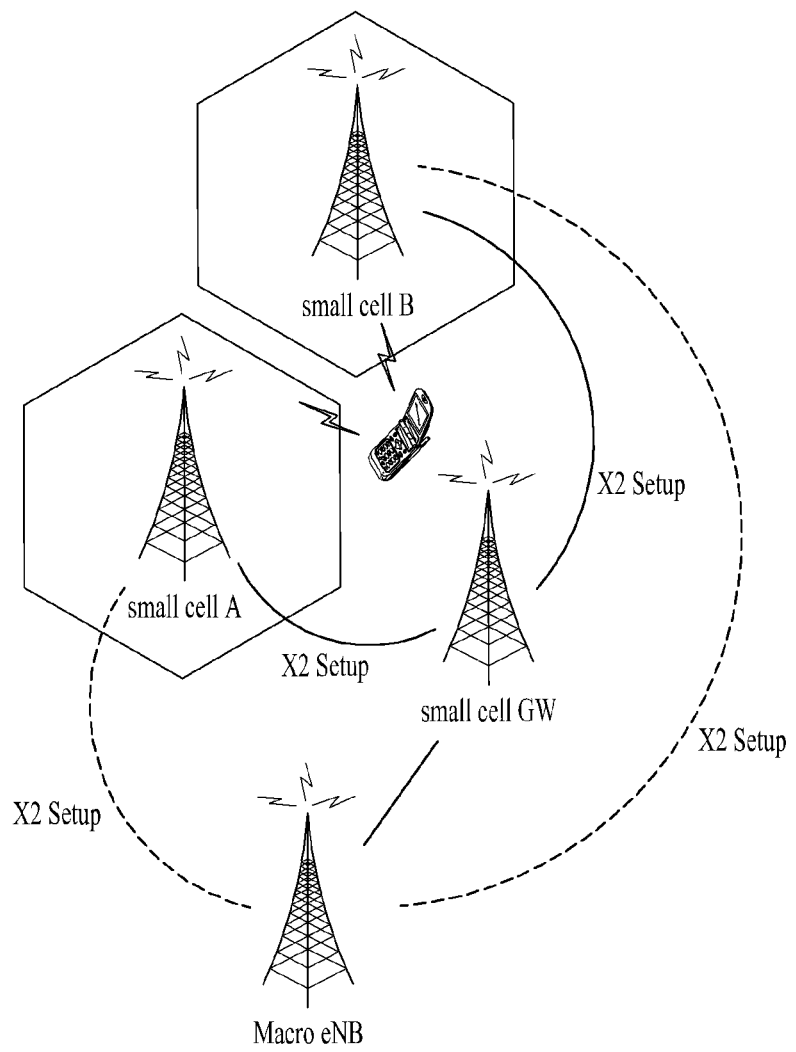
FIG. 5 illustrates an exemplary cell deployment to which embodiments of the present invention are applicable.

FIG. 5 illustrates an exemplary cell deployment to which embodiments of the present invention are applicable.

Referring to FIG. 5, two or more small cells may be deployed in the coverage of a macro eNB. The small cells may be managed and controlled by a small cell GW. In the present invention, the terms 'macro eNB' and 'macro cell' are interchangeably used in the same meaning. The macro cell may be connected to the small cell GW via an X2 interface.

FIG. 5 illustrates a scenario in which a macro cell may control small cells by interacting with the small cells. The macro cell may be connected to the small cells via direct interfaces or via indirect interfaces through the small cell GW.

II. Overview of Network Attachment Procedure

Figure 6:
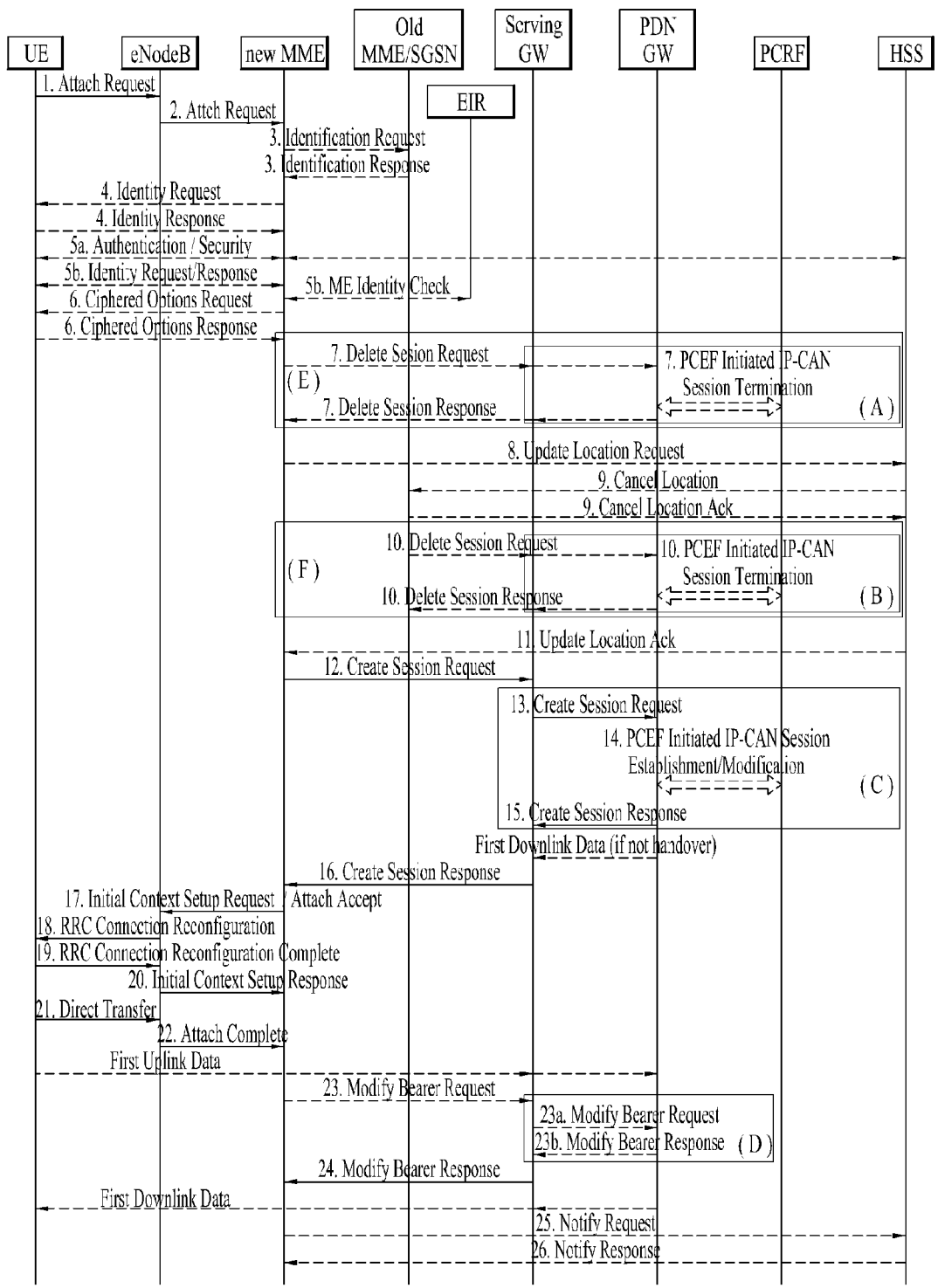
FIG. 6 is a flowchart illustrating an exemplary network attachment procedure in a Long Term Evolution/Long Term Evolution-Advanced (LTE/LTE-A) system.

FIG. 6 is a flowchart illustrating an exemplary network attachment procedure in an LTE/LTE-A system.

Referring to FIG. 6, a UE needs to register with a network to receive services that require registration. This registration is called network attachment. 'Always on IP connectivity' for the UE is enabled by establishing a default EPS bearer during a network attachment procedure. The network attachment procedure may trigger one or more dedicated bearer establishment procedures to establish a dedicated EPS bearer for that UE. During the network attachment procedure, the UE may request IP address allocation.

Now, a description will be given of the network attachment procedure with reference to FIG. 6. The network attachment procedure is performed in the following steps.

Step 1. The UE initiates the network attachment procedure by transmitting, to an eNode B, an Attach Request message including RRC parameters indicating the selected Network and an old Globally Unique Mobility Management Entity Identifier (GUMMEI).

The Attach Request message includes an International Mobile Subscriber Identity (IMSI) or an old GUTI, an Old GUTI type, a last visited TAI (if available), UE Core Network Capability, UE Specific DRX parameters, Attach Type, ESM message container (Request Type, PDN Type, Protocol Configuration Options, Ciphered Options Transfer Flag), KSI-ASME, a NAS sequence number, NAS-MAC, an additional GUTI, P-TMSI signature, Voice domain preference and UE's usage setting, and/or MS Network Capability parameters.

Step 2. The eNode B derives an MME from the RRC parameters carrying the old GUMMEI and the indicated selected network. If that MME is not associated with the eNode B or the old GUMMEI is not available, the eNode B selects a new MME. The eNode B forwards the Attach Request message to the new MME.

Step 3. If the UE identifies itself with a GUTI and the MME has changed since detach, the new MME uses the GUTI received from the UE to derive an old MME/SGSN address and transmits an Identification Request message to the old MME/SGSN to request the IMSI.

Upon receipt of the Identification Request message, the old MME/SGSN first verifies the Attach Request message and then responds to the new MME with an Identification Response message.

Step 4. If the UE is unknown to both the old MME/SGSN and the new MME, the new MME transmits an Identity Request message to the UE to request the IMSI. The UE responds to the new MME with an Identity Response message.

Step 5a. If no UE context for the UE exists anywhere in the network, if the Attach Request message transmitted in Step 1 was not integrity protected, or if the check of the integrity failed, then authentication and NAS security setup to activate integrity protection and NAS ciphering are mandatory. Otherwise it is optional. For example, if a NAS security algorithm is to be changed, the NAS security setup is performed in this step.

Step 5b. A Mobile Equipment (ME) identity should be retrieved from the UE. The ME identity should be transferred encrypted unless the UE performs an emergency attachment procedure and may not be authenticated.

Step 6. If the UE has set the Ciphered Options Transfer Flag in the Attach Request message, the Ciphered Options (i.e. PCO or APN or both) should be retrieved from the UE. Thus the new MME transmits a Ciphered Options request message to the UE and the UE transmits a Ciphered Options response message including an Access Point Name (APN) to the new MME.

Step 7. If there are active bearer contexts in the new MME for the UE, the new MME deletes these bearer contexts by transmitting a Delete Session Request message to a Serving Gateway (S-GW). The S-GW forwards the Delete Session Request message to a Packet Data Network (PDN) GW. If a Policy Control and Charging Rules Function (PCRF) is deployed, the PDN GW employs an IP-CAN session termination procedure to indicate that the bearer contexts have been released.

Step 8. If the MME has changed since the last detach, or if there is no valid subscription context for the UE in the MME, or if the UE provides an IMSI, the new MME transmits an Update Location Request message to a Home Subscriber Server (HSS). The Update Location Request message may include information such as an MME ID, an IMSI, an ME identity, MME capabilities, ULR-Flags, an IMS Voice over PS session supported Indication, UE Single Radio Voice Call Continuity (SRVCC) capabilities, etc.

Step 9. The HSS transmits a Cancel Location message to the old MME. The Cancel Location message includes the IMSI and Cancel Type. The old MME transmits a Cancel Location Ack messages including the IMSI and removes the MM and bearer contexts for the UE. If the ULR-Flags indicate "Initial-Attach-Indicator" and the HSS has the SGSN registration, then the HSS transmits a Cancel Location message to the old SGSN.

Step 10. If there are active bearer contexts in the old MME/SGSN for the UE, the old MME/SGSN deletes these bearer contexts by transmitting a Delete Session Request message to the GW. The GW transmits a Delete Session Response message to the old MME/SGSN. If a PCRF is deployed in the network, the PDN GW performs an IP CAN session termination procedure to indicate that the bearer contexts have been released.

Step 11. The HSS acknowledges the Update Location message by transmitting an Update Location Ack message to the new MME. The Update Location Ack message may include the IMSI and subscription data. The subscription data contains one or more PDN subscription contexts. Each PDN subscription context includes an 'EPS subscribed QoS profile' and a subscribed Access Point Name-Aggregated Maximum Bit Rate (APN-AMBR).

Step 12. The new MME selects an S-GW and allocates an EPS Bearer identity for the default bearer associated with the UE. Then the new MME transmits a Create Session Request message to the selected S-GW. The Create Session Request message may include IMSI, MSISDN, MME TEID for the control plane, DPN GW Address, PDN Address, APN, RAT Type, default DPS bearer QoS, PDN type, APN-AMBR, EPS Bearer Identity, Protocol Configuration Options, Handover Indication, ME Identity, User Location Information (ECGI), UE Time Zone, User CSG Information, an MS info change reporting support indication, Selection Mode, Charging Characteristics, Trace Reference, Trace Type, Trigger ID, Operation and Maintenance Center (OMC) Identity, Protocol Type over S5/S8, and Serving Network.

For emergency attachment, the MME applies parameters from MME Emergency Configuration Data for the emergency bearer establishment performed in this step.

If a subscribed PDN address is allocated to the UE for this APN, the PDN subscription context includes the UE's IPv4 address and/or IPv6 prefix and optionally a PDN GW identity. If the PDN subscription context includes a subscribed IPv4 address and/or IPv6 prefix, the new MME indicates the PDN subscribed context in the PDN address.

Step 13. Upon receipt of the Create Session Request message, the S-GW creates a new entry in its EPS bearer table and transmits the Create Session Request message to the PDN GW indicated by the PDN GW address received in the previous step. After this step, the S-GW buffers any DL packets received from the PDN GW.

Step 14. If a dynamic PCC is deployed and a Handover Indication is not present, the PDN GW performs an IP-CAN session establishment procedure, thereby obtaining a default PCC rule for the UE. This may lead to the establishment of a number of dedicated bearers.

The IMSI, APN, UE IP address, User Location Information (ECGI), UE Time Zone, Serving Network, RAT type, APN-AMBR, and Default EPS Bearer QoS are provided to the PCRF by the PDN GW. The User Location Information and UE Time Zone are used for location-based charging.

Step 15. The PDN GW creates a new entry in its EPS bearer context table and generates a Charging Id. The new entry allows the PDN GW to route user plane PDUs between the S-GW and the PDN. The PDN GW transmits a Create Session Response message to the S-GW. Create Session Response message includes PDN GW address for the user-plane, PDN GW TEID for the user plane, PDN GW TEID for the control plane, PDN type, PDN Address, EPS Bearer Identity, EPS Bearer QoS, Protocol Configuration Options. Charging ID, Prohibited Payload Compression, APN Restriction, Cause, MS Info Change Reporting Action (Start), CSG Information Reporting Action (Start), and APN-AMBR.

Step 16. The S-GW transmits the Create Session Response message to the new MME. If The MS Info Change Reporting Action (Start) and/or the CSG Information Reporting Action (Start) are received for this bearer context, the S-GW should store the information for the bearer context and report to the PDN GW that the UE's location and/or the User CSG information change has occurred.

Step 17. If an APN Restriction is received, the new MME stores this value for the bearer context and checks this received value with a stored value for a Maximum APN Restriction to ensure there are no conflicts between the values. If the bearer context is accepted, the new MME determines a new value for the Maximum APN Restriction. The new MME transmits an Attach Accept message to the eNode B. The Attach Accept message includes APN, GUTI, PDN Type, PDN Address, TAI List, EPS Bearer Identity allocated to the UE, Session Management Request, Protocol Configuration Options, NAS Sequence Number, NAS-MAC, IMS Voice over PS Session Support Indication, Emergency Service Support Indication, and LCS Support Indication.

The Attach Accept message is contained in an S1_MME control message Initial Context Setup Request. The S1 control message also includes AS security context information for the UE, the Handover Restriction List, the EPS Bearer QoS, the UE-AMBR, EPS Bearer Identity, as well as the TEID at the S-GW used for the user plane, and the address of the S-GW for the user plane.

Step 18. The eNode B transmits an RRC Connection Reconfiguration message including the EPS Radio Bearer Identity to the UE, and the Attach Accept message is transmitted along to the UE. The UE stores QoS Negotiated, Radio Priority, Packet Flow Id, and TI received in a Session Management Request message. The APN is provided to the UE to notify it of the APN for which the default bearer is associated. The UE provides EPS Bearer QoS parameters to an application handling a traffic flow. The UE should not reject the RRC Connection Reconfiguration message on the basis of the EPS Bearer QoS parameters included in the Session Management Request message.

Step 19. The UE transmits an RRC Connection Reconfiguration Complete message to the eNode B.

Step 20. The eNode B transmits an Initial Context Response message to the new MME. The Initial Context Response message includes the TEID of the eNode B and the address of the eNode B used for DL traffic on an S1_U reference point. The new MME should be prepared to receive Initial Context Response message either before or after an Attach Complete message.

Step 21. The UE transmits a Direct Transfer message to the eNode B, which includes the Attach Complete message with the EPS Bearer Identity, the NAS sequence number, and the NAC-MAC.

Step 22. The eNode B forwards the Attach Complete message to the new MME in a UL NAS Transport message. After the Attach Accept message and once the UE has obtained a PDN Address, the UE transmits UL packets to the eNode B which are tunneled to the S-GW and PDN GW.

Step 23. Upon receipt of both the Initial Context Response message in step 20 and the Attach Complete message in step 22, the new MME transmits a Modify Bearer Request message to the S-GW. The Modify Bearer Request message includes the EPS Bearer Identity, the eNode B address, the eNode B REID, and the Handover Indication.

Step 23a. If the Handover Indication is included in step 23, the S-GW transmits a Modify Bearer Request message to the PDN GW to prompt the PDN GW to tunnel packets from non 3GPP IP access to 3GPP access system and immediately starts routing packets to the S-GW.

Step 23b. The PDN GW acknowledges by transmitting a Modify Bearer Response message to the S-GW.

Step 24. The S-GW acknowledges by transmitting an Update Bearer Response message to the new MME. The S-GW may then buffer DL packets.

Step 25. After the new MME receives the Modify Bearer Response message, if Request Type does not indicate handover but indicates that an EPS bearer was established and the subscription data indicates that the user is allowed to perform handover to non-3GPP accesses, and if the MME selected a PDN GW that is different from the PDN GW identity which was indicated by the HSS in the PDN subscription context, the MME transmits a Notify Request message including the APN and PDN GW identity to the HSS. The message includes information that identifies the PLMN in which the PDN GW is located.

Step 26. The HSS stores the APN and PDN GW identity pair and transmits a Notify Response message to the new MME.

As described above, if a UE is to receive a service requiring registration, the UE may register to a network by performing the network attachment procedure illustrated in FIG. 6. That is, the UE may be allocated a dedicated EPS bearer in the network attachment procedure. In addition, steps indicated by dotted arrows are optional and steps indicated by solid arrows are mandatory in FIG. 6. The network attachment procedure of FIG. 6 is performed with one eNB (i.e. a macro eNB or a small cell eNB). On the other hand, embodiments of performing the network attachment procedure of FIG. 6 with a plurality of eNBs/cells will be described below.

III. Method for Supporting a Plurality of Connections

Embodiments of the present invention provide methods for performing a network attachment procedure with two or more cells simultaneously to establish a plurality of connections with the two or more cells. Hereinbelow, methods for supporting a plurality of connections to form a UE zone according to embodiments of the present invention will be described in detail.

Figure 7:
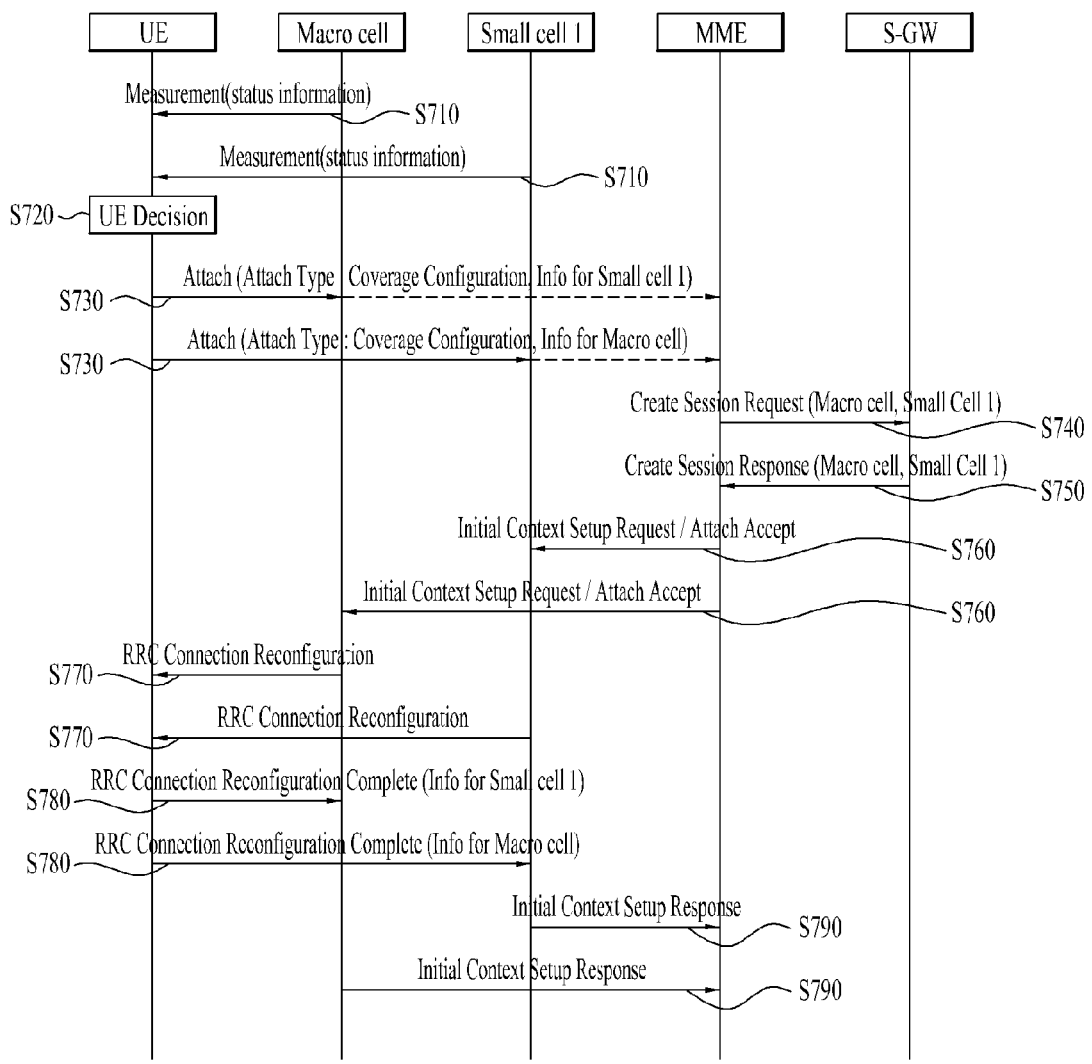
FIG. 7 is a diagram illustrating a signal flow for a method for supporting a plurality of connections according to an embodiment of the present invention.

FIG. 7 is a diagram illustrating a signal flow for a method for supporting a plurality of connections according to an embodiment of the present invention.

In embodiments of the present invention, an eNB that manages a macro cell may be referred to as a macro cell eNB and an eNB that manages a small cell may be referred to as a small cell eNB. For the convenience of description, a macro cell eNB and a small cell eNB will be referred to as a macro cell and a small cell, respectively. In addition, a description of messages used in the following operation will be minimized and a description of information/fields/parameters included in each message is pursuant to the description of the messages of FIG. 6.

Referring to FIG. 7, each of a macro cell and a small cell transmits, to a UE, a Measurement message including information about its load status (e.g. a hardware load, an S1 Transport Network Layer (TNL) load, etc. as defined in RAN3 WG) or information about a radio resource usage status (as defined in RNA3 WG) (S710).

While the UE receives the Measurement messages from one macro cell and one small cell in step S710, this is purely exemplary. Thus, the UE may receive Measurement messages from one or more macro cells or one or more small cells. In addition, the load status information and the radio resource usage status information may be used as defined in the current 3GPP LTE-A specification, or may be used as defined otherwise.

The UE may determine cells to register to, based on the Measurement messages received in step S710 in order to form a UE zone. For example, the UE may select small cells in good states with a macro cell and perform a network attachment procedure with the macro cell and the small cells simultaneously. In the illustrated case of FIG. 7, the UE determines to form a UE zone by registering to the macro cell and a first small cell (small cell 1) (S720).

Subsequently, the UE transmits Attach Request messages to the macro cell and small cell 1 to perform the network attachment procedure with the macro cell and small cell 1. The macro cell and small cell 1 forward the Attach Request messages to an MME (S730).

Attach Type is set to a new type, Coverage Configuration in the Attach Request messages. That is, if Attach Type is set to Coverage Configuration, the Attach Request messages may include information about cells to which the UE will establish a plurality of connections to form a UE zone.

For example, the Attach Request message transmitted to the macro cell in step S730 includes information about small cell 1 that the UE wants to configure as a UE zone, and the Attach Request message transmitted to the small cell in step S730 includes identification information about the macro cell offering the current best link quality to the UE. The identification information may be a Physical Cell Identifier (PCID) used to identify a macro cell or a small cell or an E-UTRAN Cell Global Identifier (ECGI) used to identify a cell within an E-UTRAN globally.

Upon receipt of the Attach Request message having Attach type set to Coverage Configuration from the macro cell or small cell 1, the MME awaits reception of an Attach Request message from another macro cell or another small cell, for UE zone configuration. After receiving Attach Request messages from all macro cells and/or small cells set in the Attach Request messages, the MME collects information included in the Attach Request messages.

The MME may determine the number of macro cells and small cells to which the UE wants to establish connections. Therefore, if the MME does not receive Attach Request messages from cells related to UE zone configuration for a predetermined time, the MME considers that UE zone configuration is failed. Then the MME may indicate the attach request as failed to the corresponding cells, as an error processing operation.

The MME may determine small cells and/or macro cells to which the UE wants to establish a plurality of connections and transmits a Create Session Request message for session creation to an S-GW to establish a plurality of connections (S740).

After receiving the Create Session Request message, the S-GW creates double sessions for the macro cell and small cell 1. In addition, the S-GW transmits a Create Session Response message including information about the created sessions to the MME (S750).

If a UE zone is successfully formed by the simultaneous double sessions with the macro cell and small cell 1, the MME transmits an Attach Accept message indicating the successful formation of the UE zone to each of the macro cell and small cell 1. The Attach Accept message is included in an S1 message, Initial Context Setup Request (S760).

Upon receipt of the Attach Accept messages, the macro cell and small cell 1 associated with the UE zone configuration transmit, to the UE, RRC Connection Reconfiguration messages including a first EPS Radio Bearer ID identifying a first EPS radio bearer used in the macro cell and a second EPS Radio Bearer ID identifying a second EPS radio bearer used in small cell 1, respectively (S770).

The UE transmits a Connection Reconfiguration Complete message in response to the RRC Connection Reconfiguration message to each of the macro cell and small cell 1. The Connection Reconfiguration Complete message for the macro cell includes information about small cell 1 and the Connection Reconfiguration Complete message for small cell 1 includes information about the macro cell (S780).

Upon receipt of the Connection Reconfiguration Complete messages, the macro cell and small cell 1 transmit, to the MME, Initial Context Setup Response messages in response to the Initial Context Setup Request messages received in step S760 (S790).

Figure 8:
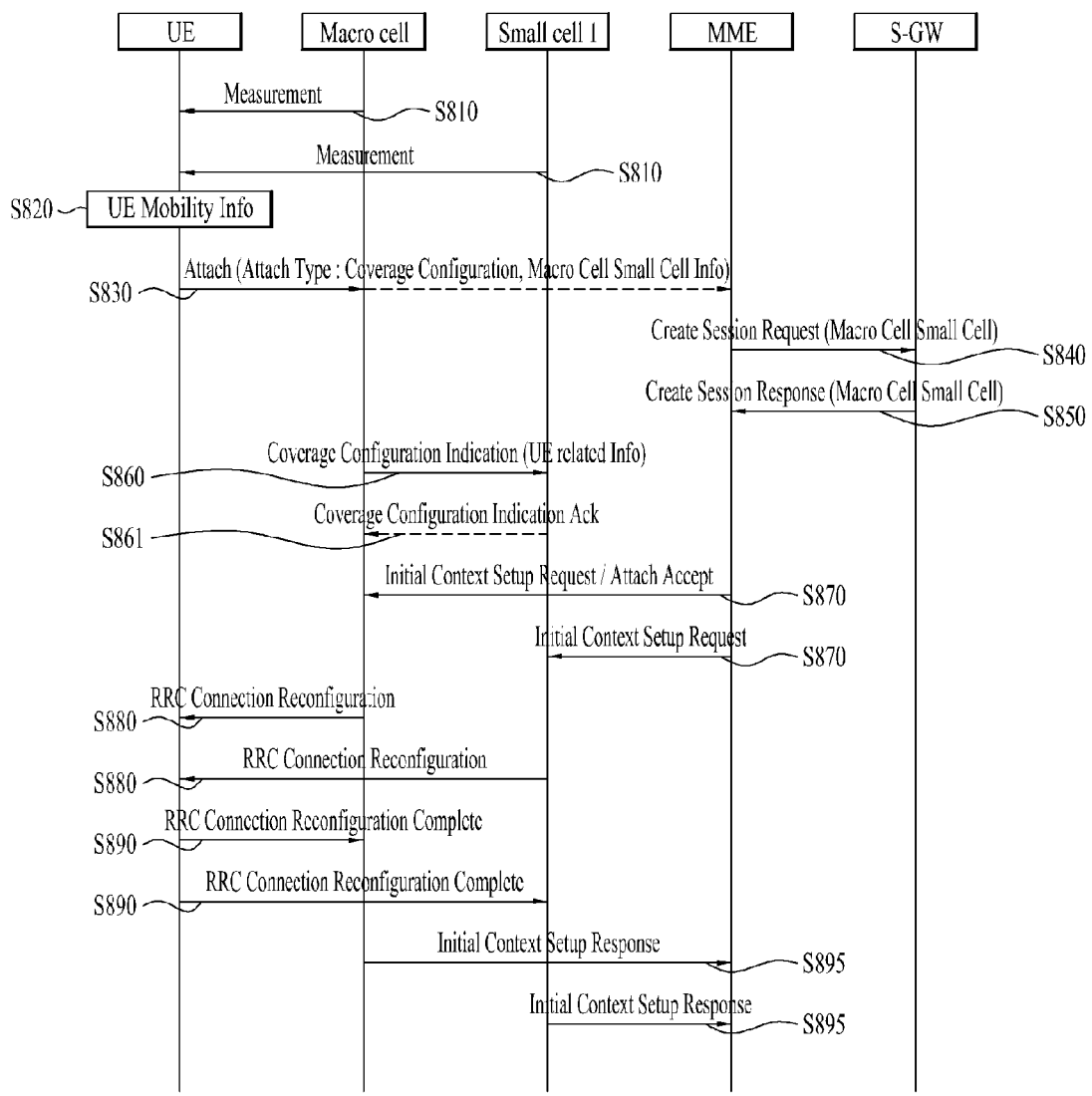
FIG. 8 is a diagram illustrating a signal flow for a method for supporting a plurality of connections according to another embodiment of the present invention.

FIG. 8 is a diagram illustrating a signal flow for a method for supporting a plurality of connections according to another embodiment of the present invention.

Referring to FIG. 8, each of a macro cell and a small cell transmits, to a UE, a Measurement message including information about its load status (e.g. a hardware load, an S1 TNL load, etc. as defined in RAN3 WG) or information about a radio resource usage status (as defined in RNA3 WG) (S810).

While the UE receives the Measurement messages from one macro cell and one small cell in step S810, this is purely exemplary. Thus, the UE may receive Measurement messages from one or more macro cells or one or more small cells. In addition, the load status information and the radio resource usage status information may be used as defined in the current 3GPP LTE-A specifications, or may be used as defined otherwise.

Upon receipt of the Measurement messages, the UE acquires its mobility information for use in forming a UE zone. The UE may determine cells to register to, based on the Measurement messages received in step S810 in order to form a UE zone. For example, the UE may select small cells in good states with a macro cell and perform a network attachment procedure with the macro cell and the small cells simultaneously. In the illustrated case of FIG. 8, the UE determines to form a UE zone by registering to the macro cell and a first small cell (small cell 1) (S820).

Subsequently, the UE transmits an Attach Request message to the macro cell (S830).

Attach type of the Attach Request message is defined as a new type, Coverage Configuration. If Attach Type is set to Coverage Configuration, the Attach Request message may include Macro Cell Small Cell (MCSC) information indicating that the macro cell and small cell 1 are candidate cells for a UE zone and/or the UE mobility information.

For example, the MCSC information includes identification information about the macro cell and small cell 1 that the UE wants to configure as a UE zone in step S830. The identification information may be a PCID used to identify a macro cell or a small cell or an ECGI used to identify a cell within an E-UTRAN globally.

The macro cell determines small cells that may provide optimum connectivity to the UE based on the load statuses of small cells (e.g. hardware loads, S1 TNL loads, etc. as defined in RAN3 WG) or information about radio resource usage statuses (as defined in RNA3 WG) of the small cells and/or the MCSI information included in the Attach Request message in step S830. The macro cell forwards the received Attach Request message to the MME.

Upon receipt of the Attach Request message having Attach Type set to Coverage Configuration from the macro cell, the MME may determine the number of macro cells and small cells to which the UE wants to establish connections. Therefore, if the MME does not receive the Attach Request message from the macro cell for a predetermined time, the MME considers that UE zone configuration is failed. Then the MME may indicate attach request as failed to the macro cell, as an error processing operation.

That is, the MME may determine small cells and/or macro cells to which the UE wants to establish a plurality of connections and transmits a Create Session Request message for session creation to an S-GW to establish a plurality of connections (S840).

After receiving the Create Session Request message, the S-GW creates double sessions (e.g., a first EPS radio bearer and a second EPS radio bearer) for the macro cell and small cell 1. In addition, the S-GW transmits a Create Session Response message including information about the created sessions to the MME (S850).

Optionally, the macro cell may transmit a Coverage Configuration Indication message including information about the UE (e.g., UE mobility information, etc.) to small cell 1 (S860) and small cell 1 may reply to the macro cell with a Coverage Configuration Indication Ack message (S861).

If the UE zone is formed successfully through the simultaneous creation of the plurality of sessions for the macro cell and small cell 1, the MME transmits an Attach Accept message indicating the successful formation of the UE zone to each of the macro cell and small cell 1. The Attach Accept message is included in an S1 message, Initial Context Setup Request (S870).

Upon receipt of the Attach Accept messages, the macro cell and small cell 1 associated with the UE zone configuration transmit, to the UE, RRC Connection Reconfiguration messages including a first EPS Radio Bearer ID identifying a first EPS radio bearer used in the macro cell and a second EPS Radio Bearer ID identifying a second EPS radio bearer used in small cell 1, respectively (S880).

The UE transmits a Connection Reconfiguration Complete message in response to the RRC Connection Reconfiguration message to each of the macro cell and small cell 1. The Connection Reconfiguration Complete message for the macro cell includes information about small cell 1 and the Connection Reconfiguration Complete message for small cell 1 includes information about the macro cell (S890).

Upon receipt of the Connection Reconfiguration Complete messages, the macro cell and small cell 1 transmit, to the MME, Initial Context Setup Response messages in response to the Initial Context Setup Request messages received in step S860 (S895).

Figure 9:
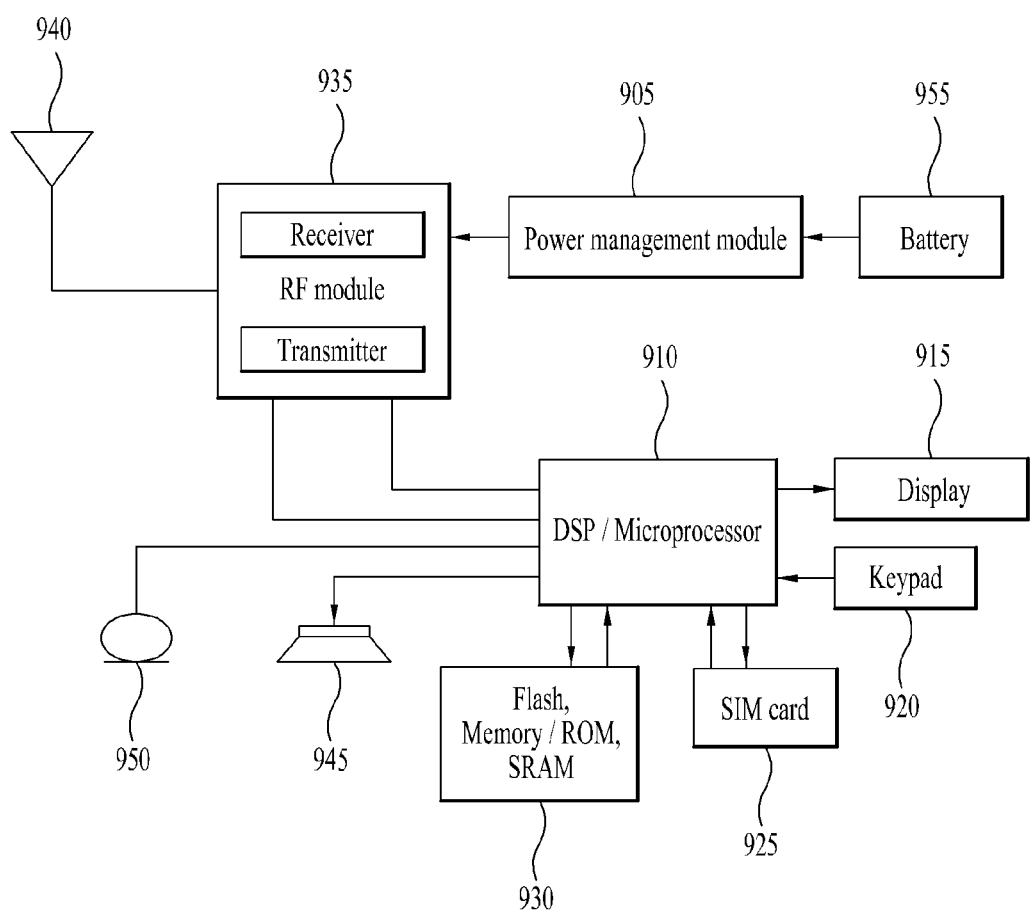
FIG. 9 illustrates a structure of a communication apparatus (e.g. a User Equipment (UE) or an evolved Node B (eNB or eNode B)) used in embodiments of the present invention.

FIG. 9 illustrates one of structures of a communication apparatus (e.g. a User Equipment (UE) or an evolved Node B (eNB or e Node B)) used in embodiments of the present invention.

Referring to FIG. 9, a UE 10 includes a microprocessor (or a Digital Signal Processor (DSP)) 910, a Radio Frequency (RF) module 935, a power management module 905, an antenna 940, a battery 955, a display 915, a keypad 920, a memory 930, a Subscriber Identification Module (SIM) card 925 (it may be an option), a speaker 945, and a microphone 950.

A user enters command information such as a phone number by pressing of buttons of the keypad 920 or voice activation through the microphone 950. The microprocessor 910 receives and processes the command information and performs an appropriate function such as dialing of the phone number. Operation data may be extracted from the SIM card 925 or the memory module 930 and a function may be performed according to the operation data. The microprocessor 910 may display command information and operation information on the display 915, for user reference and convenience.

The processor 910 starts communication such as transmission of a radio signal carrying voice communication data by providing command information to the RF module 935. The RF module 935 includes a receiver to receive a radio signal and a transmitter to transmit a radio signal. The antenna 941 facilitates transmission and reception of a radio signal. Upon receipt of a radio signal, the RF module 935 downconverts the radio signal to a baseband signal, to be processed in the microprocessor 910. The processed signal is converted to audible or readable information and output, for example, through the speaker 945. The microprocessor 910 implements protocols and functions required for the afore-described various processes.

As is apparent from the above description, the embodiments of the present invention have the following effects.

First, a UE zone can be formed by supporting a plurality of connections for a UE in a small-cell environment.

Second, a UE zone configuration method may be provided in a UE-centered manner beyond conventional cell-based connectivity. Therefore, a UE can conduct efficient communication in the UE-zone.

Third, a method for performing a network attachment procedure simultaneously with a plurality of cells for UE zone configuration can be provided.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The embodiments of the present invention are applicable to various wireless access systems such as 3GPP, 3GPP2, and/or IEEE 802.xx. The embodiments of the present invention are also applicable to any technical field in which the various access systems find their applications.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method for performing a plurality of network attachment procedures to form a User Equipment (UE) zone with a plurality of cells at a UE in a wireless communication system, the method comprising:
    receiving, from a macro cell and a plurality of small cells, one or more measurement messages each including at least one of load status information and radio resource usage status information;
    selecting the macro cell and a first small cell with which the plurality of network attachment procedures are to be performed, based on the one or more measurement messages;
    transmitting, to the macro cell, an attach request message including an attach type indicating the plurality of network attachment procedures and information about the first small cell;
    transmitting, to the first small cell, an attach request message including an attach type indicating the plurality of network attachment procedures and information about the macro cell;
    receiving, from the macro cell, a first Radio Resource Control (RRC) connection reconfiguration message including a first Evolved Packet System (EPS) radio bearer Identifier (ID) used in the macro cell;
    receiving, from the first small cell, a second RRC connection reconfiguration message including a second EPS radio bearer ID used in the first small cell; and
    performing data communication by connecting to the macro cell and the first small cell simultaneously using the first EPS radio bearer ID and the second EPS radio bearer ID.

2. The method according to claim 1, wherein the load status information is information about at least one of a hardware load and an S1 Transport Network Layer (TNL) load.

3. The method according to claim 1, further comprising:
    transmitting, to the macro cell, a first RRC connection reconfiguration complete message including information about the first small cell in response to the first RRC connection reconfiguration message; and
    transmitting, to the first small cell, a second RRC connection reconfiguration complete message including information about the macro cell in response to the second RRC connection reconfiguration message.

4. A method for supporting a plurality of network attachment procedures to allow a User Equipment (UE) to form a UE zone with a plurality of cells at a Mobility Management Entity (MME) in a wireless access system, the method comprising:

receiving, from a macro cell, a first attach request message including an attach type indicating the plurality of network attachment procedures and information about a first small cell to form the UE zone;

receiving, from the first small cell, a second attach request message including an attach type indicating the plurality of network attachment procedures and information about the macro cell;

configuring the UE zone based on the first attach request message and the second attach request message;

allocating a first Evolved Packet System (EPS) radio bearer Identifier (ID) and a second EPS radio bearer ID for use in the UE zone to the UE;

transmitting, to the macro cell, a first attach accept message including the first EPS radio bearer ID used in the macro cell; and transmitting, to the first small cell, a second attach accept message including the second EPS radio bearer ID used in the first small cell, wherein the MME supports data communication that the UE performs by connecting to the macro cell and the first small cell simultaneously using the first EPS radio bearer ID and the second EPS radio bearer ID.

5. The method according to claim 4, wherein each of the first attach accept message and the second attach accept message is transmitted in an initial context setup request message.

6. The method according to claim 4, further comprising:
transmitting, to a Serving GateWay (S-GW), a session creation request message to form the UE zone with the plurality cells; and
receiving, from the S-GW, a session creation response message including information about a created session in response to the session creation request message.

7. A User Equipment (UE) for performing a plurality of network attachment procedures to form a UE zone with a plurality of cells in a wireless communication system, the UE comprising:
a transmitter;
a receiver; and
a processor,
wherein the processor is configured to receive, from a macro cell and a plurality of small cells through the receiver, one or more measurement messages each including at least one of load status information and radio resource usage status information, to select the macro cell and a first small cell with which the plurality of network attachment procedures are to be performed, based on the one or more measurement messages, to transmit, to the macro cell through the transmitter, an attach request message including an attach type indicating the plurality of network attachment procedures and information about the first small cell, to transmit, to the first small cell through the transmitter, an attach request message including an attach type indicating the plurality of network attachment procedures and information about the macro cell, to receive, from the macro cell through the receiver, a first Radio Resource Control (RRC) connection reconfiguration message including a first Evolved Packet System (EPS) radio bearer Identifier (ID) used in the macro cell, and to receive, from the first small cell through the receiver, a second RRC connection reconfiguration message including a second EPS radio bearer ID used in the first small cell, wherein the UE performs data communication by connecting to the macro cell and the first small cell simultaneously using the first EPS radio bearer ID and the second EPS radio bearer ID.

8. The UE according to claim 7, wherein the load status information is information about at least one of a hardware load and an S1 Transport Network Layer (TNL) load.

9. The UE according to claim 7, wherein the processor transmits, to the macro cell through the transmitter, a first RRC connection reconfiguration complete message including information about the first small cell in response to the first RRC connection reconfiguration message, and transmits, to the first small cell through the transmitter, a second RRC connection reconfiguration complete message including information about the macro small cell in response to the second RRC connection reconfiguration message.

10. A Mobility Management Entity (MME) for supporting a plurality of network attachment procedures to allow a User Equipment (UE) to form a UE zone with a plurality of cells in a wireless access system, the MME comprising:
a transmitter;
a receiver; and
a processor,
wherein the processor is configured to receive, from a macro cell through the receiver, a first attach request message including an attach type indicating the plurality of network attachment procedures and information about a first small cell to form the UE zone, to receive, from the first small cell through the receiver, a second attach request message including an attach type indicating the plurality of network attachment procedures and information about the macro cell, to configure the UE zone based on the first attach request message and the second attach request message, to allocate a first Evolved Packet System (EPS) radio bearer Identifier (ID) and a second EPS radio bearer ID for use in the UE zone to the UE, to transmit, to the macro cell through the transmitter, a first attach accept message including the first EPS radio bearer ID used in the macro cell, and to transmit, to the first small cell through the transmitter, a second attach accept message including the second EPS radio bearer ID used in the first small cell, wherein the MME supports data communication that the UE performs by connecting to the macro cell and the first small cell simultaneously using the first EPS radio bearer ID and the second EPS radio bearer ID.

11. The MME according to claim 10, wherein each of the first attach accept message and the second attach accept message is transmitted in an initial context setup request message.

12. The MME according to claim 10, wherein the processor transmits, to a Serving GateWay (S-GW) through the transmitter, a session creation request message to form the UE zone with the plurality cells, and receives, from the S-GW through the receiver, a session creation response message including information about a created session in response to the session creation request message.

* * * * *